(No Model.)

J. TOREN.
BICYCLE TIRE.

No. 606,604. Patented June 28, 1898.

Witnesses.
S. B. Denton,
Fred B. Parks,

Inventor.
Jacob Toren
By Cilley & Allgier
Attorneys.

THE NORRIS PETERS CO., PHOTO-LITHO., WASHINGTON, D. C.

UNITED STATES PATENT OFFICE.

JACOB TOREN, OF GRAND RAPIDS, MICHIGAN.

BICYCLE-TIRE.

SPECIFICATION forming part of Letters Patent No. 606,604, dated June 28, 1898.

Application filed October 15, 1897. Serial No. 655,326. (No model.)

*To all whom it may concern:*

Be it known that I, JACOB TOREN, a citizen of the United States, residing at Grand Rapids, in the county of Kent and State of Michigan, have invented certain new and useful Improvements in Bicycle-Tires, of which the following is a specification.

My invention relates to spring-tires for bicycles; and its objects are, first, to provide a spring-tire that will have the general appearance and elasticity of a pneumatic tire, and, second, to provide springs for bicycle-tires that may be readily detached and will have sufficient elasticity to readily adjust themselves to the weight being borne by the bicycle, and will at the same time be sufficiently rigid to avert the danger of crushing when coming in sudden contact with an obstacle. I attain these objects by the mechanism illustrated in the accompanying drawings, in which—

Figure 1:
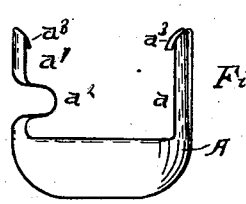
Figure 2:
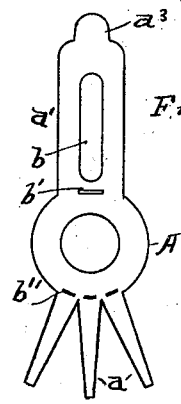
Figure 3:
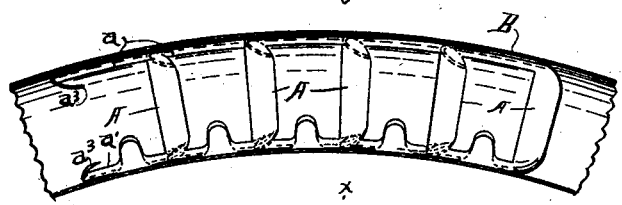
Figure 4:
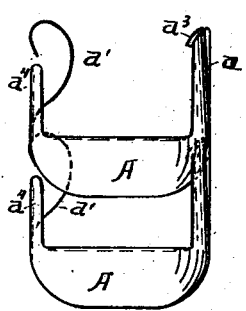
Figure 5:
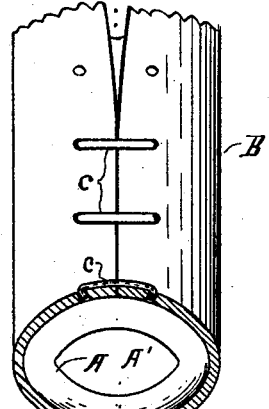
Figure 6:
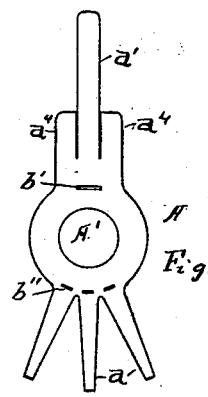
Figure 7:
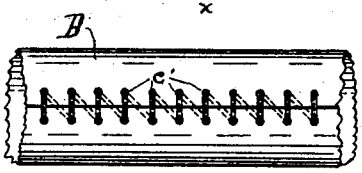

Figure 1 is a side view of a link from my chain of springs. Fig. 2 is a plan of a blank from which these links are formed. Fig. 3 is a sectional elevation of a piece of tire with my device in position, said section being on the line $x\ x$ of Fig. 5. Fig. 4 shows a modified form of attachment for the links. Fig. 5 is a perspective of a tire in section, showing the manner of securing the edges of the covering with staples. Fig. 6 is a plan of the blank from which my modified form of link is formed, and Fig. 7 shows the cover laced instead of fastened with staples.

Similar letters refer to similar parts throughout the several views.

In constructing my tires I form a chain of a series of cup-shaped links A, as indicated in Figs. 1, 3, and 4, formed from blanks of very thin spring-steel or other suitable material of substantially the form shown in Figs. 2 or 6. The three fingers $a$ are designed to form the outer surface or tread of the links and have a hook $a^3$ formed at the end of each and in proper position to engage the mortises $b''$—that is, the fingers of each link will engage with the mortises of each succeeding one and are designed to be broad enough to meet the natural necessity of a reasonably broad tread to the tire. The lower arm $a'$ forms the lower or inner connection of the link by the hooks $a^3$ thereon, exactly similar to the corresponding hooks on the arms $a$, engaging with the mortise $b'$ near the body. My preferred form is that shown in Fig. 1, where the arm passes between the cover B and the body A of the link and engages the mortise from the outside. When using this form, I form a curve $a^2$ between the body of the link and the end on the arm in position to stand between the links when they are in position, to provide for any flexibility that may be required to meet the action of the tire when passing over the surface of the ground. In order that the tension of this spring may not be too great, I form a slot $b$ in the arm. I cut out the centers of the links, as at A', so that the body of the link is substantially annular, and by this means greatly facilitate the elastic qualtities of the tire.

When using the form of link shown in Figs. 4 and 6, I find it necessary to extend the hook portion $a'$ back some distance toward the body A and form wings $a^4$ on each side of the back end thereof to give the proper and necessary bearing upon the rim of the wheel that supports the tire. With this form of arm the spring $a'$ passes through the aperture A' in the body of the link and engages the mortise from the inside of the link instead of from the outside, as with the other or preferred form.

My tires may be secured—that is, the covers around the links—by the use of staples or studs, as indicated in Fig. 5, or they may be laced, as in Fig. 7, either of which are available, but I deem the former the preferable of the two.

I prefer that my tire-cover be opened the entire length on the inner side, so that it can be readily opened to reach a spring or link at any point for the purpose of repairing, removing, or replacing, and for this purpose I prefer the studs to the lacing, as a stud may be taken out at any place, while a lace would in many cases have to be removed for some distance.

My links can be placed in tubes or coverings that are not open the entire circle, but it is not as desirable, as the cover cannot then be so thoroughly adjusted or the springs so readily inserted. Besides, in many cases the entire series of links would have to be removed to repair a single link.

Having thus fully described my invention, what I claim as new, and desire to secure by Letters Patent of the United States, is—

1. In a bicycle-tire, a series of links formed from thin elastic plates, the body of said links being formed from a substantially annular blank and made dishing, arms projecting from the rims of these bodies and provided with hooks arranged to engage mortises formed therefor, the arms projecting from the inner side of said links being bent to form a longitudinal spring, substantially as and for the purpose set forth.

2. In a bicycle-tire, cup-shaped links, arms projecting from the rims of said links and arranged to engage with mortises in each succeeding link, the lower or inner arms arranged to form springs to give to the links a longitudinal flexibility, and a support at each side of the arms next to the body, substantially as and for the purpose set forth.

3. In a bicycle-tire, a series of flexible cup-shaped links formed of spring metal and flexibly connected by arms extending from the back edge of one cup and passing into slots in the face of the next succeeding cup, the lower or inner arm being arranged to reciprocate longitudinal of the tire, and a cover detachably secured around said links, substantially as and for the purpose set forth.

Signed at Grand Rapids, Michigan, October 12, 1897.

JACOB TOREN.

In presence of—
A. ALLGIER,
I. J. CILLEY.